(12) United States Patent
Otsubo

(10) Patent No.: US 10,591,113 B2
(45) Date of Patent: Mar. 17, 2020

(54) PRESSURE VESSEL

(71) Applicant: TOYOTA JIDOSHA KABUSHIKI KAISHA, Toyota-shi, Aichi-ken (JP)

(72) Inventor: Hirokazu Otsubo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 15/855,158

(22) Filed: Dec. 27, 2017

(65) Prior Publication Data
US 2018/0238496 A1 Aug. 23, 2018

(30) Foreign Application Priority Data

Feb. 23, 2017 (JP) .................. 2017-031637

(51) Int. Cl.
*F17C 13/04* (2006.01)
*F17C 1/00* (2006.01)
*F17C 1/02* (2006.01)

(52) U.S. Cl.
CPC .............. *F17C 13/04* (2013.01); *F17C 1/00* (2013.01); *F17C 1/02* (2013.01); *F17C 2201/0109* (2013.01); *F17C 2201/056* (2013.01); *F17C 2201/058* (2013.01); *F17C 2203/011* (2013.01); *F17C 2203/0604* (2013.01); *F17C 2203/066* (2013.01); *F17C 2203/0619* (2013.01); *F17C 2203/0636* (2013.01); *F17C 2203/0643* (2013.01); *F17C 2203/0663* (2013.01); *F17C 2205/0305* (2013.01); *F17C 2205/0323* (2013.01); *F17C 2205/0391* (2013.01); *F17C 2221/012* (2013.01); *F17C 2223/0123* (2013.01); *F17C 2223/036* (2013.01); *F17C 2270/0184* (2013.01); *Y02E 60/321* (2013.01)

(58) Field of Classification Search
CPC .... F17C 13/04; F17C 1/00; F17C 1/02; F17C 2201/0109; F17C 2201/056; F17C 2201/058; F17C 2203/011; F17C 2203/0604; F17C 2203/0619; F17C 2203/0636; F17C 2203/0643; F17C 2203/066; F17C 2203/0663; F17C 2205/0305; F17C 2205/0323; F17C 2205/0391; F17C 2221/012; F17C 2223/0123; F17C 2223/036; F17C 2270/0184
USPC ........................................................ 220/592
See application file for complete search history.

(56) References Cited

U.S. PATENT DOCUMENTS 5,862,938 A * 1/1999 Burkett ................. F17C 13/084
220/589
8,448,808 B2 * 5/2013 Tani .......................... F17C 1/16
220/586

(Continued)

FOREIGN PATENT DOCUMENTS

JP 2011-002006 A 1/2011
JP 2011-085230 A 4/2011

*Primary Examiner* — Shawn M Braden
(74) *Attorney, Agent, or Firm* — Oliff PLC

(57) ABSTRACT

A pressure vessel comprising: a liner made from a composite material including a resin section made from resin and a metallic section made from metal, the liner forming internal space for storage of a fluid; and a metallic ferrule attached to an end portion of the liner and including a part exposed to the outside, wherein the metallic section includes a first part contacting the ferrule and a second part exposed in the internal space.

4 Claims, 3 Drawing Sheets

(56) References Cited

U.S. PATENT DOCUMENTS

| | | | |
|---|---|---|---|
| 9,316,357 B2* | 4/2016 | Heo .......................... | F17C 1/06 |
| 2009/0071965 A1* | 3/2009 | Iida ...................... | B29C 70/086 |
| | | | 220/586 |
| 2009/0255940 A1* | 10/2009 | Murate .................... | F17C 1/16 |
| | | | 220/592 |
| 2011/0089181 A1 | 4/2011 | Yamamoto | |

* cited by examiner

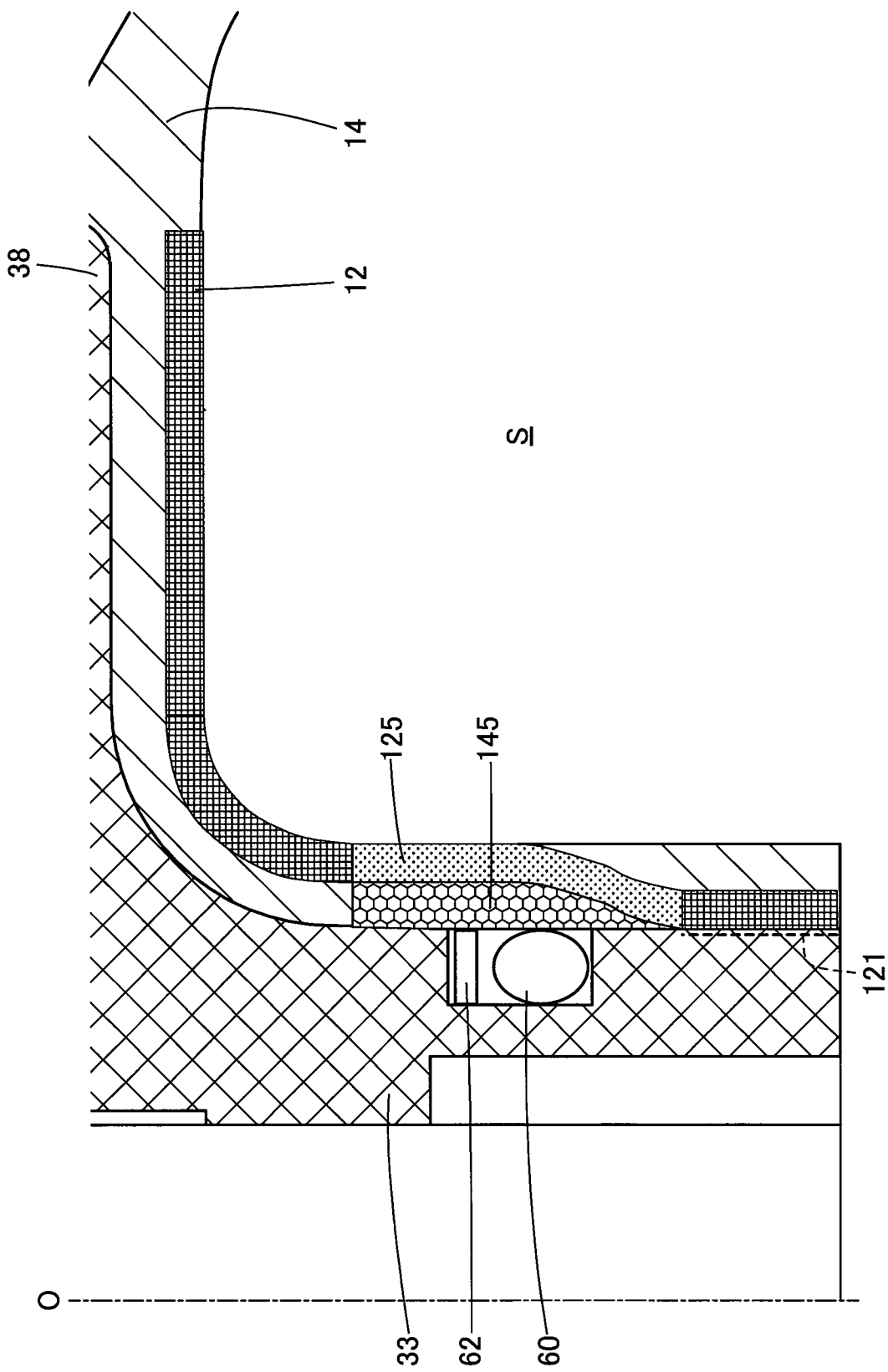

PRESSURE VESSEL

CROSS-REFERENCE TO RELATED APPLICATION

This application claims priority from Japanese application P2017-031637 filed on Feb. 23, 2017, the disclosure of which is hereby incorporated in its entirety by reference into this application.

TECHNICAL FIELD

This disclosure relates to a pressure vessel.

BACKGROUND ART

According to a technique disclosed by JP2011-085230A, an insert ring is provided to a pressure vessel. In JP2011-085230A, the insert ring is buried in a liner formed around a protrusion of a ferrule. The protrusion of the ferrule forms a part of the ferrule and is a cylindrical part formed in internal space.

In JP2011-085230A, sufficient consideration is not given to dissipation of heat in the internal space of the pressure vessel to the outside. During filling of the pressure vessel with gas, the temperature of the gas is increased by adiabatic compression. Hence, promoting heat dissipation from the internal space is preferred. In consideration of the above-described issue, this disclosure is intended to promote heat dissipation from internal space of a pressure vessel to the outside of the pressure vessel.

SUMMARY

In one aspect of this disclosure, a pressure vessel comprises: a liner made from a composite material including a resin section made from resin and a metallic section made from metal, the liner forming internal space for storage of a fluid; and a metallic ferrule attached to an end portion of the liner and including a part exposed to the outside. The metallic section includes a first part contacting the ferrule and a second part exposed in the internal space. This aspect promotes dissipation of heat from the internal space of the pressure vessel to the outside of the pressure vessel.

BRIEF DESCRIPTION OF THE DRAWINGS

FIG. 3 is a sectional view showing a protrusion and its vicinity in an enlarged manner.

DESCRIPTION OF THE EMBODIMENTS

Figure 1:
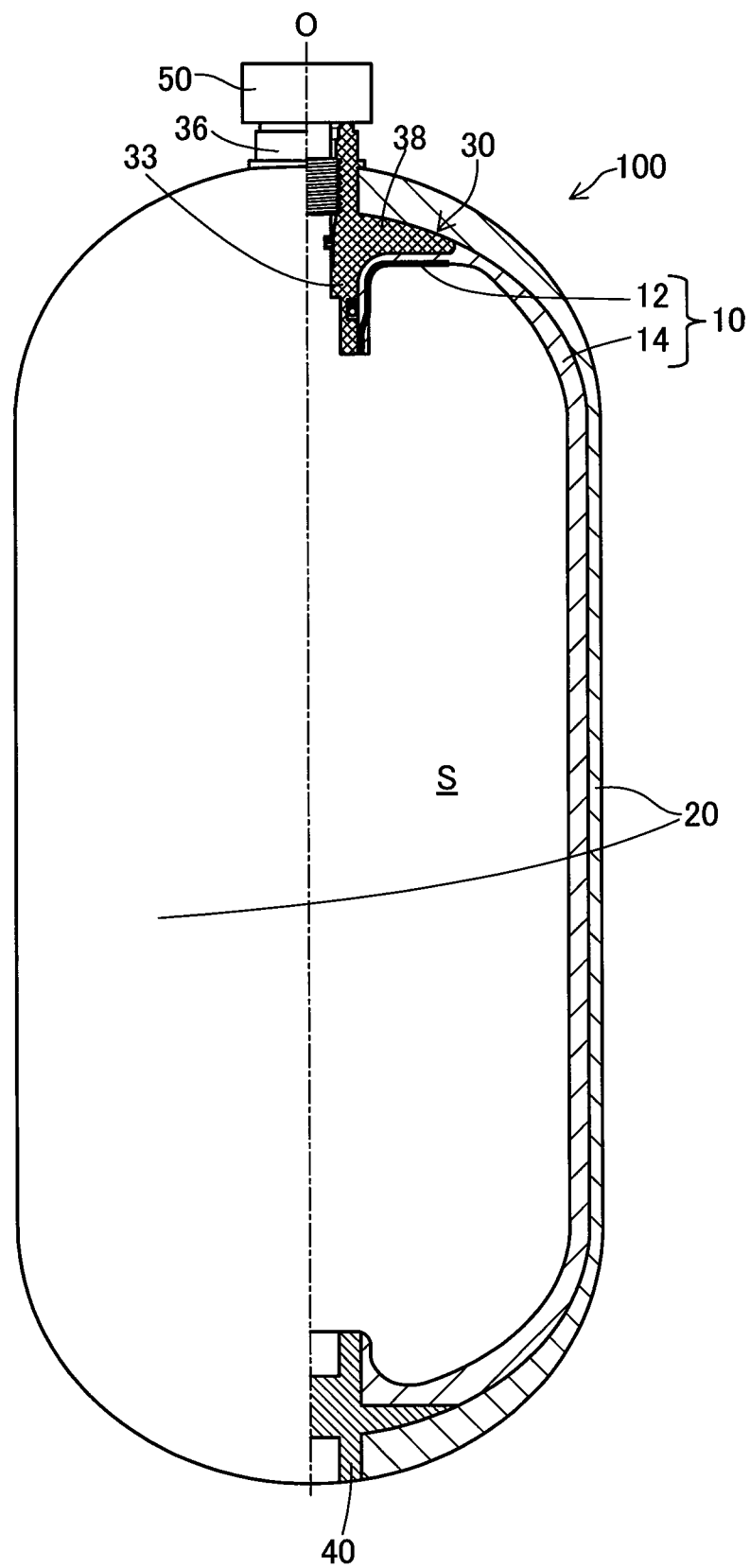
FIG. 1 is a partial sectional view of a pressure vessel.

FIG. 1 is a partial sectional view of a pressure vessel 100. The pressure vessel 100 stores a high-pressure fluid. The pressure vessel 100 of this embodiment stores high-pressure hydrogen. The pressure vessel 100 is installed on a fuel cell vehicle.

The pressure vessel 100 includes a liner 10, a reinforcing layer 20, a ferrule 30, an end boss 40, and a valve 50. Each of the liner 10, the reinforcing layer 20, the ferrule 30, and the end boss 40 is formed to be substantially rotationally symmetric about an axis line O. The liner 10 forms internal space S for storage of a fluid together with the ferrule 30 and the end boss 40.

The liner 10 is made from a composite material. More specifically, the liner 10 is made from a composite material of metal and resin. Still more specifically, the liner 10 is made from a composite material of stainless steel and nylon. A section made from stainless steel and forming the liner 10 is called a metallic section 12. A section made from nylon and forming the liner 10 is called a resin section 14. The metallic section 12 and the resin section 14 will be described in detail by referring to FIG. 2.

The liner 10 has a shape extending in the direction of the axis line O. This shape has a cylindrical part, and parts formed on opposite sides of the cylindrical part and reduced in diameter at positions closer to corresponding end portions. The liner 10 has an opening portion at each of these end portions. The ferrule 30 is attached to one of the end portions. The end boss 40 is attached to the other end portion. In the following description, a place closer to the ferrule 30 in the direction of the axis line O is called a front end side, and a place closer to the end boss 40 in the direction of the axis line O is called a rear end side. The liner 10 and the ferrule 30 are joined to each other by press fitting.

The ferrule 30 is made from metal. More specifically, the ferrule 30 is made from aluminum. The ferrule 30 includes a protrusion 33, a cylindrical part 36, and a flange 38. The cylindrical part 36 has a substantially cylindrical shape. The cylindrical part 36 is exposed partially to the outside.

The flange 38 is a flange-like part connected to the cylindrical part 36 and jutting out in a radial direction. The radial direction is a direction perpendicular to the direction of the axis line O. The protrusion 33 is a substantially cylindrical part connecting to the flange 38 and protruding toward the rear end side. Protruding toward the rear end side may be rephrased as protruding toward a direction away from the valve 50.

The ferrule 30 promotes dissipation of heat in the internal space S to the outside. A function of promoting this heat dissipation is achieved by the heat conductivity of aluminum as a material for the ferrule 30 being higher than that of nylon as a material for the resin section 14 and that of CFRP (described later) as a material for the reinforcing layer 20.

The end boss 40 is made from metal. More specifically, the end boss 40 is made from aluminum. Like the ferrule 30, the end boss 40 promotes dissipation of heat in the internal space S to the outside.

The reinforcing layer 20 is made from fiber-reinforced plastic. More specifically, the reinforcing layer 20 is made from CFRP that are the initials of carbon-fiber reinforced plastic. The reinforcing layer 20 is formed to cover the outer surface of the liner 10. The reinforcing layer 20 reinforces the liner 10 to increase the strength of the pressure vessel 100.

The valve 50 is made from metal. More specifically, the valve 50 is made from aluminum. The valve 50 is attached to an opening portion of the ferrule 30. The opening portion of the ferrule 30 is an opening portion of the cylindrical part 36. Opening the valve 50 allows supply of hydrogen into the internal space S or supply of hydrogen in the internal space S to the outside. Closing the valve 50 allows the internal space S to be closed hermetically.

The valve 50 is partially inserted into the cylindrical part 36 of the ferrule 30. A flow path in the valve 50 has an end opened in the internal space S.

Figure 2:
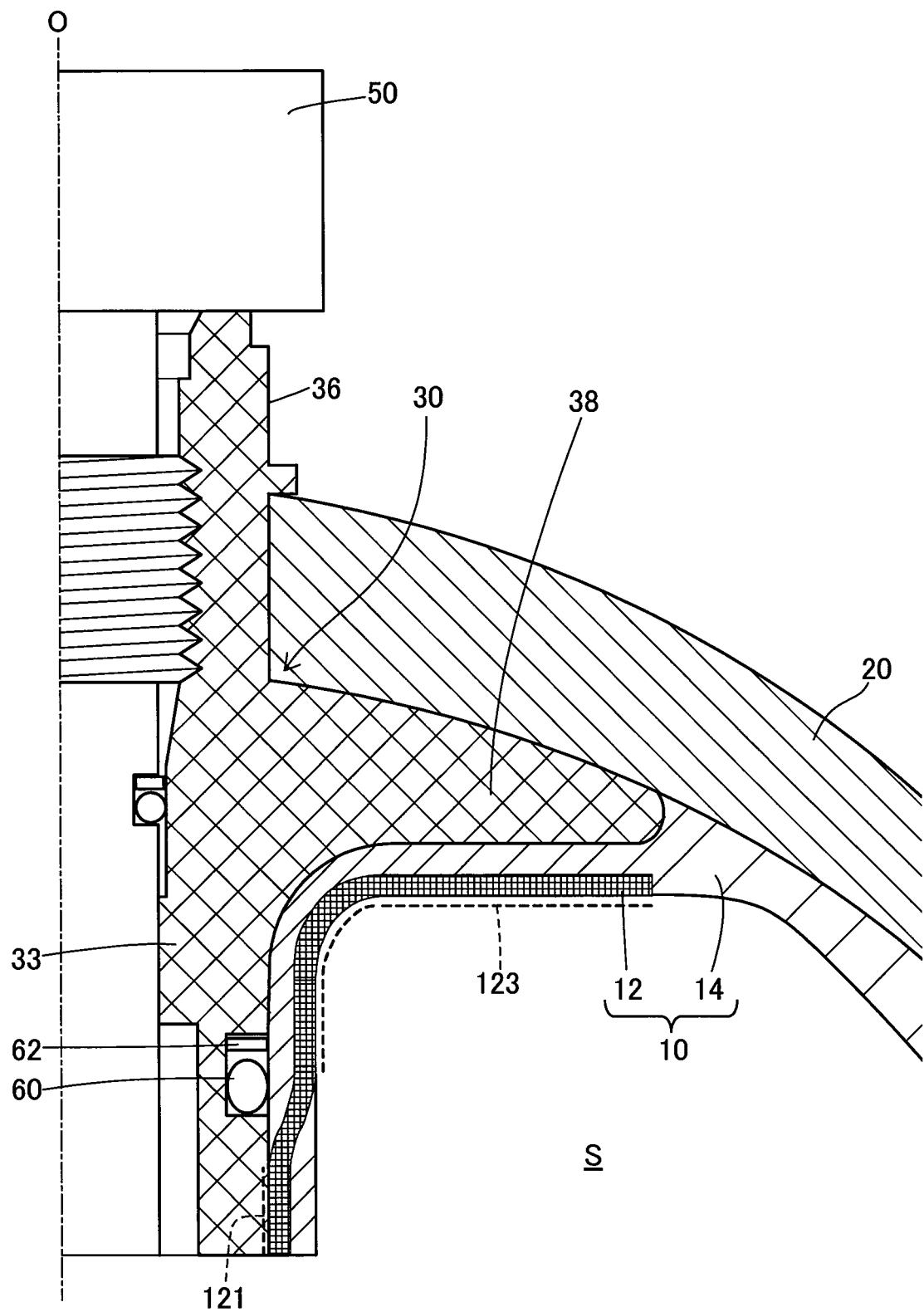
FIG. 2 is a sectional view showing a ferrule and its vicinity in an enlarged manner.

FIG. 2 is a sectional view showing the ferrule 30 and its vicinity in an enlarged manner. The ferrule 30 partially contacts the liner 10. More specifically, the flange 38 partially contacts the resin section 14, and the outer peripheral surface of the protrusion 33 contacts the metallic section 12 and the resin section 14.

As shown in FIG. 2, an O-ring 60 and a back-up ring 62 are arranged between the outer peripheral surface of the protrusion 33 and the inner peripheral surface of the resin section 14. The O-ring 60 and the back-up ring 62 are members for increasing airtightness between the liner 10 and the ferrule 30.

A part of the outer peripheral surface of the protrusion 33 contacting the metallic section 12 is located closer to the rear end side than the O-ring 60. A part of the outer peripheral surface of the protrusion 33 contacting the resin section 14 includes a part contacting the O-ring 60 and a part closer to the front end side than the part contacting the O-ring 60.

Nylon used for forming the resin section 14 has good adhesion with aluminum used for forming the flange 38. Thus, sufficient airtightness is ensured between the liner 10 and the ferrule 30 at least in a place closer to the front end side than the O-ring 60.

As described above, the metallic section 12 partially contacts the outer peripheral surface of the protrusion 33. A part of a surface of the metallic section 12 contacting the outer peripheral surface of the protrusion 33 is called a contact surface 121.

As shown in FIG. 2, the metallic section 12 is partially exposed in the internal space S. A part of the surface of the metallic section 12 exposed in the internal space S is called an exposed surface 123. The exposed surface 123 includes a part facing the flange 38 and a part facing the protrusion 33. The part facing the flange 38 means a part arranged in such a manner that the resin section 14 is caught between this part and a surface of the flange closer to the rear end side. The part facing the protrusion 33 means a part arranged in such a manner that the resin section 14 is caught between this part and the outer peripheral surface of the protrusion 33.

A boundary between the protrusion 33 and the flange 38 is not defined clearly. Thus, a boundary between the part facing the flange 38 and the part facing the protrusion 33 is also not defined clearly. However, in this embodiment, the part facing the flange 38 is described as having a boundary with the part facing the protrusion 33. Specifically, the part facing the flange 38 is described as being continuous with the part facing the protrusion 33.

As shown in FIG. 2, the valve 50 has a male screw formed at the outer peripheral surface of a columnar part inserted into the cylindrical part 36 of the ferrule 30. A female screw is formed at the inner peripheral surface of the cylindrical part 36 of the ferrule 30. By the threaded engagement between the male screw and the female screw, the valve 50 is attached to the opening portion of the ferrule 30.

With the above-described configuration, dissipation of heat from the internal space S to the outside is promoted. The following describes a path for heat transfer characteristic in this embodiment.

Heat of hydrogen filling the internal space S is transferred to the metallic section 12 at the exposed surface 123. The heat transferred to the metallic section 12 is transferred to the protrusion 33 through the contact surface 121. The heat transferred to the protrusion 33 is transferred to the cylindrical part 36 or to the valve 50. If being transferred to the cylindrical part 36, the heat is dissipated to the outside through a surface of the cylindrical part 36 exposed to the outside. If being transferred to the valve 50, the heat is dissipated to the outside through a surface of the valve 50 exposed to the outside.

The members forming the above-described path are all made from metal. This achieves efficient heat dissipation, compared to heat dissipation through a path including the resin section 14 or the reinforcing layer 20. This makes it possible to reduce time required for filling the pressure vessel 100 with hydrogen or reduce energy for cooling during the filling.

In this embodiment, the provision of the part facing the flange 38 to the exposed surface 123 increases the area of the exposed surface 123, compared to a case where the exposed surface 123 has only the part facing the protrusion 33. Increase in the area of the exposed surface 123 promotes transfer of heat from hydrogen filling the internal space S to the metallic section 12.

FIG. 3 is a sectional view showing the protrusion 33 and its vicinity in an enlarged manner. An outer peripheral surface contact part 145 is a part of the resin section 14. The outer peripheral surface contact part 145 contacts the outer peripheral surface of the protrusion 33. As described above, a boundary between the protrusion 33 and the flange 38 is not defined clearly. Thus, a boundary between the outer peripheral surface contact part 145 and a part of the resin section 14 contacting the flange 38 is also not defined clearly. A boundary between the outer peripheral surface contact part 145 and the part of the resin section 14 contacting the flange 38 is shown in FIG. 3 for the purpose of illustration.

A covering part 125 is a part of the metallic section 12. The covering part 125 covers the outer peripheral surface contact part 145 externally in the radial direction and contacts the outer peripheral surface contact part 145.

The covering part 125 maintains the shape of the outer peripheral surface contact part 145. In this embodiment, the outer peripheral surface contact part 145 has a part contacting the O-ring 60, so that the above-described function of the covering part 125 contributes largely to the airtightness of the pressure vessel 100.

As described above, the liner 10 and the ferrule 30 are joined by press fitting. This increases airtightness further in a place where the outer peripheral surface contact part 145 and the O-ring 60 contact each other. To realize press fitting between the liner 10 and the ferrule 30, the outer diameter of the protrusion 33 before the press fitting is larger than the diameter of an opening portion of the liner 10 before the press fitting. The opening portion of the liner 10 before the press fitting means a through hole formed from the contact surface 121 and the inner peripheral surface of the outer peripheral surface contact part 145.

In this embodiment, both the inner diameter of the contact surface 121 and the inner diameter of the outer peripheral surface contact part 145 are smaller than the outer diameter of the protrusion 33 in a state before the press fitting. The inner diameter of the outer peripheral surface contact part 145 being smaller than the outer diameter of the protrusion 33 in a state before the press fitting contributes to increase in the above-described airtightness after the press fitting.

The inner diameter of the contact surface 121 being smaller than the outer diameter of the protrusion 33 in a state before the press fitting contributes to efficient transfer of heat from the contact surface 121 to the protrusion 33 and stable joint between the liner 10 and the ferrule 30 after the press fitting.

In this embodiment, the inner diameter of the covering part 125 is smaller than the outer diameter of the protrusion 33 in a state before the press fitting. The inner diameter of the covering part 125 being smaller than the outer diameter of the protrusion 33 in a state before the press fitting contributes to further increase in the above-described airtightness and more stable joint between the liner 10 and the ferrule 30 after the press fitting.

This disclosure is not limited to the above-described embodiments, examples, or modifications in this specification but is feasible in the form of various configurations within a range not deviating from the substance of this disclosure. For example, technical features in the embodiments, those in the examples, or those in the modifications corresponding to those in each of the aspects described in Summary can be replaced or combined, where appropriate, with the intention of solving some or all of the aforementioned problems or achieving some or all of the aforementioned effects. Unless being described as absolute necessities in this specification, these technical features may be deleted, where appropriate. The following configurations are applicable, for example.

The resin section forming the liner may be made from synthetic resin such as nylon-based resin (polyamide-based resin) or polyethylene-based resin, for example.

The metallic section forming the liner may be made from a material other than stainless steel. Aluminum is applicable, for example.

The metallic section may contact the ferrule at any part. For example, the metallic section may contact both the protrusion and the flange, or may contact only the flange.

The outer end of the exposed surface of the metallic section may be located inwardly in the radial direction from the outer end of the flange.

The metallic section may not include the part facing the flange or may not include the part facing the protrusion.

In a state before the liner and the ferrule are joined, at least one of the inner diameter of the contact surface 121 and the inner diameter of the outer peripheral surface contact part 145 may be larger than the outer diameter of the protrusion 33.

In one aspect of this disclosure, a pressure vessel comprises: a liner made from a composite material including a resin section made from resin and a metallic section made from metal, the liner forming internal space for storage of a fluid; and a metallic ferrule attached to an end portion of the liner and including a part exposed to the outside. The metallic section includes a first part contacting the ferrule and a second part exposed in the internal space. This aspect promotes dissipation of heat from the internal space of the pressure vessel to the outside of the pressure vessel. This is achieved by reason that the metallic section is made from metal and has high heat conductivity correspondingly, so that the metallic section functions as an effective path for transfer of heat from the internal space to the ferrule.

In the above-described aspect, the pressure vessel may further comprise an end boss attached to the liner at an end portion opposite the end portion where the ferrule is attached. The ferrule may include a protrusion protruding in the internal space toward the end boss. The resin section may include an outer peripheral surface contact part contacting an outer peripheral surface of the protrusion. The metallic section may include a covering part covering the outer peripheral surface contact part externally in a radial direction and contacting the outer peripheral surface contact part. In this aspect, the outer peripheral surface contact part made from resin is caught between the protrusion and the covering part made from metal. This stabilizes the shape of the outer peripheral surface contact part.

In the above-described embodiment, the ferrule may include a cylindrical part and a flange. The cylindrical part has an opening portion with an opening oriented externally. The flange is connected to the cylindrical part and jutting out in the radial direction.

A part of the metallic section facing the flange may has at least part of the second part. In this aspect, the metallic section is exposed in the internal space in a larger area. This promotes transfer of heat from a fluid stored in the internal space to the metallic section. This eventually promotes dissipation of heat from the internal space of the pressure vessel to the outside of the pressure vessel.

This disclosure is feasible as various aspects other than the above-described aspects. For example, this disclosure is feasible as a method of manufacturing the above-described pressure vessel.

What is claimed is:

1. A pressure vessel comprising:
    a liner made from a composite material including a resin section made from resin and a metallic section made from metal, the liner forming internal space for storage of a fluid; and
    a metallic ferrule attached to an end portion of the liner and including a part exposed to the outside, a flange extending in a radial direction of the liner, and a protrusion extending in an axial direction of the liner, wherein
    the metallic section has a plate shape including a first contact face and a second contact face which face away from each other along the entire metallic section,
    wherein the first contact face is partially arranged between the protrusion and the resin section parallel to the protrusion, and is partially in surface contact with the protrusion, and
    wherein the second contact face includes a first part that is arranged parallel to the protrusion and that is partially in surface contact with the resin section, and a second part that is arranged parallel to the flange and that is exposed in the internal space.

2. The pressure vessel in accordance with claim 1, further comprising an end boss attached to the liner at an end portion opposite the end portion where the metallic ferrule is attached, wherein
    the protrusion protrudes in the internal space toward the end boss,
    the resin section includes an outer peripheral surface contact part contacting an outer peripheral surface of the protrusion, and
    the metallic section includes a covering part covering the outer peripheral surface contact part externally in the radial direction and contacting the outer peripheral surface contact part.

3. The pressure vessel in accordance with claim 2, wherein
    the metallic ferrule further includes a cylindrical part, the cylindrical part having an opening portion with an opening oriented externally, the flange being connected to the cylindrical part and jutting out in the radial direction, and
    a part of the metallic section facing the flange includes at least a portion of the second contact face and at least a portion of the first contact face.

4. The pressure vessel in accordance with claim 1, wherein an axial free end portion of the metallic section is positioned in the radial direction between the metallic ferrule and a radially innermost portion of the resin section exposed in the internal space.

* * * * *